United States Patent
Gil et al.

(10) Patent No.: US 9,210,034 B2
(45) Date of Patent: Dec. 8, 2015

(54) CLIENT ADDRESSING AND ROAMING IN A WIRELESS NETWORK

(75) Inventors: Thomer M. Gil, Brookline, MA (US); Sanjit Biswas, San Francisco, CA (US); John Bicket, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 1109 days.

(21) Appl. No.: 12/039,557

(22) Filed: Feb. 28, 2008

(65) Prior Publication Data

US 2008/0288614 A1 Nov. 20, 2008

Related U.S. Application Data

(60) Provisional application No. 60/892,449, filed on Mar. 1, 2007, provisional application No. 60/892,432, filed on Mar. 1, 2007, provisional application No. 60/892,437, filed on Mar. 1, 2007, provisional application No. 60/892,440, filed on Mar. 1, 2007, provisional application No. 60/892,443, filed on Mar. 1, 2007.

(51) Int. Cl.
| | |
|---|---|
| *G06F 15/177* | (2006.01) |
| *H04L 12/24* | (2006.01) |
| *H04W 8/00* | (2009.01) |
| *H04W 8/26* | (2009.01) |
| *G06F 15/16* | (2006.01) |
| *H04L 29/12* | (2006.01) |
| *H04W 48/16* | (2009.01) |
| *H04W 84/12* | (2009.01) |
| *H04W 88/08* | (2009.01) |
| *H04W 88/16* | (2009.01) |

(52) U.S. Cl.
CPC ............ *H04L 41/04* (2013.01); *H04L 29/1232* (2013.01); *H04L 41/0246* (2013.01); *H04L 41/0803* (2013.01); *H04L 41/22* (2013.01); *H04W 8/005* (2013.01); *H04W 8/26* (2013.01);
(Continued)

(58) Field of Classification Search
CPC ...... H04L 41/04; H04L 41/0803; H04L 41/22
USPC .................................. 709/217–222
See application file for complete search history.

(56) References Cited

U.S. PATENT DOCUMENTS

| | | | |
|---|---|---|---|
| 5,796,739 A | * | 8/1998 | Kim et al. .................... 370/401 |
| 6,049,602 A | | 4/2000 | Foladare et al. |

(Continued)

FOREIGN PATENT DOCUMENTS

| | | |
|---|---|---|
| EP | 1265397 A2 | 12/2002 |
| EP | 1473900 A2 | 11/2004 |

(Continued)

OTHER PUBLICATIONS

Bicket, John, et al. "Architecture and Evaluation of an Unplanned 802.11b Mesh Network", *MobiCom'05*, Aug. 28-Sep. 2, 2005, Cologne, Germany, pp. 1-12.

(Continued)

*Primary Examiner* — Joseph Greene
(74) *Attorney, Agent, or Firm* — Novak Druce Connolly Bove + Quigg LLP

(57) ABSTRACT

A managed network receives client device requests for network addresses for communications over the managed network and computes a network address for a client device based on a hardware address of the client device, such as the MAC address of the client device, and returns the network address to the client device along with a predetermined gateway address for communications over the managed network with external networks. The MAC address is hashed to the network address that is assigned such that the client address will always receive the same network address whenever it accesses the managed network.

28 Claims, 4 Drawing Sheets

(52) U.S. Cl.
CPC ..... *H04L 29/12226* (2013.01); *H04L 29/12839* (2013.01); *H04L 41/026* (2013.01); *H04L 61/2015* (2013.01); *H04L 61/2092* (2013.01); *H04L 61/6022* (2013.01); *H04W 48/16* (2013.01); *H04W 84/12* (2013.01); *H04W 88/08* (2013.01); *H04W 88/16* (2013.01)

(56) References Cited

U.S. PATENT DOCUMENTS

| | | | | |
|---|---|---|---|---|
| 6,496,502 | B1* | 12/2002 | Fite et al. | 370/389 |
| 6,704,301 | B2 | 3/2004 | Chari et al. | |
| 6,728,232 | B2* | 4/2004 | Hasty et al. | 370/338 |
| 6,868,080 | B1 | 3/2005 | Umansky et al. | |
| 6,917,626 | B1 | 7/2005 | Duvvury | |
| 6,925,069 | B2 | 8/2005 | Koos, Jr. et al. | |
| 7,016,328 | B2 | 3/2006 | Chari et al. | |
| 7,444,158 | B2 | 10/2008 | Shitama et al. | |
| 7,508,799 | B2 | 3/2009 | Sumner et al. | |
| 7,526,538 | B2* | 4/2009 | Wilson | 709/220 |
| 7,554,959 | B1 | 6/2009 | Dowling | |
| 7,562,393 | B2 | 7/2009 | Buddhikot et al. | |
| 7,583,695 | B2* | 9/2009 | Vimpari et al. | 370/466 |
| 7,586,879 | B2* | 9/2009 | Chari et al. | 370/331 |
| 7,590,733 | B2 | 9/2009 | Lum | |
| 7,630,341 | B2 | 12/2009 | Buddhikot et al. | |
| 7,650,148 | B2 | 1/2010 | Kim et al. | |
| 7,729,314 | B2* | 6/2010 | Siddiqi et al. | 370/331 |
| 7,881,267 | B2 | 2/2011 | Crosswy et al. | |
| 2001/0024953 | A1 | 9/2001 | Balogh | |
| 2002/0006788 | A1 | 1/2002 | Knutsson et al. | |
| 2002/0141390 | A1 | 10/2002 | Fangman et al. | |
| 2003/0084162 | A1 | 5/2003 | Johnson et al. | |
| 2003/0095520 | A1 | 5/2003 | Aalbers et al. | |
| 2003/0142641 | A1 | 7/2003 | Sumner et al. | |
| 2003/0169713 | A1 | 9/2003 | Luo | |
| 2003/0179750 | A1 | 9/2003 | Hasty et al. | |
| 2004/0141522 | A1 | 7/2004 | Texerman et al. | |
| 2004/0253970 | A1 | 12/2004 | Kunihiro | |
| 2004/0264395 | A1 | 12/2004 | Rao | |
| 2005/0059396 | A1 | 3/2005 | Chuah et al. | |
| 2005/0060364 | A1 | 3/2005 | Kushwaha et al. | |
| 2005/0229238 | A1 | 10/2005 | Ollis et al. | |
| 2005/0246769 | A1* | 11/2005 | Bao et al. | 726/16 |
| 2005/0259598 | A1 | 11/2005 | Griffin et al. | |
| 2006/0009246 | A1 | 1/2006 | Marinier et al. | |
| 2006/0014562 | A1 | 1/2006 | Syrtsov et al. | |
| 2006/0015579 | A1* | 1/2006 | Sastri et al. | 709/219 |
| 2006/0053216 | A1 | 3/2006 | Deokar et al. | |
| 2006/0089964 | A1 | 4/2006 | Pandey et al. | |
| 2006/0155833 | A1 | 7/2006 | Matsuda et al. | |
| 2006/0187873 | A1 | 8/2006 | Friday et al. | |
| 2006/0200543 | A1 | 9/2006 | Kong et al. | |
| 2006/0209714 | A1 | 9/2006 | Ackermann-Markes et al. | |
| 2006/0291443 | A1 | 12/2006 | Harrington et al. | |
| 2007/0002833 | A1 | 1/2007 | Bajic | |
| 2007/0019631 | A1 | 1/2007 | Jang | |
| 2007/0064661 | A1 | 3/2007 | Sood et al. | |
| 2007/0156813 | A1 | 7/2007 | Galvez et al. | |
| 2007/0253344 | A1 | 11/2007 | Frost et al. | |
| 2007/0276926 | A1* | 11/2007 | LaJoie et al. | 709/219 |
| 2007/0286393 | A1 | 12/2007 | Roever et al. | |
| 2008/0095180 | A1 | 4/2008 | Vucina et al. | |
| 2008/0205415 | A1 | 8/2008 | Morales | |
| 2008/0225806 | A1 | 9/2008 | Arian et al. | |
| 2009/0176509 | A1* | 7/2009 | Davis et al. | 455/456.3 |
| 2010/0260061 | A1 | 10/2010 | Bojahra et al. | |
| 2010/0265845 | A1 | 10/2010 | Lampen | |
| 2011/0029644 | A1 | 2/2011 | Gelvin et al. | |

FOREIGN PATENT DOCUMENTS

| | | |
|---|---|---|
| WO | WO03/079709 A1 | 9/2003 |
| WO | WO2006/046261 A1 | 11/2006 |
| WO | WO2006/121465 A1 | 11/2006 |

OTHER PUBLICATIONS

Buddhikot, M.M., et al. "Integration of Wireless LAN and 3G Wireless—Design and Implementation of a WLAN/CDMA2000 Interworking Architecture",*IEEE Communications Magazine* (Nov. 2003) vol. 41(11):99-100.

Caltech and Partners: "Application Monitoring API" [Online] Dec. 23, 2005, pp. 1-2, retrieved from the Internet at URL:http//monalisa.cacr.caltech.edu/monalisa_Service_Applications_ApMon.html> on Jul. 29, 2008.

"Changing Your MAC Address in Window XP/Vista, Linux and Mac OS X (Sometimes known as MAC spoofing)", retrieved from the Internet on Feb. 27, 2007 at [http://www.irongeek.com/i.php?page=security/changemac&mode=print], pp. 1-4.

Comer, D. Internetworking with TCP/IP (1995), Prentice Hall, USA, pp. 61-62, paragraph 4.5.

Congdon, P.(Hewlet Packard Company), et al. "IEEE 802.1X Remote Authentication Dial in User Service (RADIUS) Usage Guidelines", *IEFT Standard, Internet Engineering Task Force* (Sep. 2003) pp. 1-30.

Griffiths, Rob "Set newer portable Macs' sleep mode", posted at Macworld: MAC OS X Hints, on Oct. 19, 2006, retrieved from the Internet on Feb. 27, 2007 at [http://www.macworld.com/weblogs/macosxhints/2006/10/sleepmode/index.php?pf=1].

Konstantinou, A., NetCallback 1.3.1 Forwarding TCP and UDP ports behind a firewall' [Online] 2001, pp. 1-5, retrieved from the Internet at URL:http://netcallback.sourceforge.net/> on Jul. 29, 2008.

Krag, Thomas, et al. "Wireless Mesh Networking", posted at Wireless DevCenter on Jan. 22, 2004, retrieved from the Internet at [http://www.oreillynet.com/lpt/a/4535] on Feb. 27, 2007, pp. 1-9.

"No Internet With New Router, Computer, or Adapter: MAC Spoofing", posted at Netgear, retrieved from the Internet on Feb. 27, 2007 at [http://kbserver.netgear.com/kb_web_files/n101227.asp], p. 1.

Roch, Stephane "Nortel's Wireless Mesh Network solution: Pushing the boundaries of traditional WLAN technology", *Nortel Technical Journal* (Jul. 2005) Issue 2, pp. 18-23.

"The Linksys BEFSR41 Etherfast Cable/DLS Router", posted at *Network Lab—A Guide to Networking An NTL Cable Modem*, retrieved from the Internet on Feb. 27, 2007 at [http://www.networklab.co.uk/cmodem/linksys.html].

Wang, et al. "Global Connectivity for Mobile IPv6-based Ad Hoc Networks", *Proceedings of the 19th International Conference on Advanced Information Networking and Applications (AINA '05)* (Mar. 2005), vol. 2:807-812.

RFC 2131, Dynamic Host Configuration Protocol, Mar. 1997, retrieved from the internet <tools.ietf.org/pdf/rfc2131.pdf>, pp. 1-46.

Notice of Allowance, U.S. Appl. No. 12/039,520, dated Sep. 4, 2012, 10 pages.

Final Office Action, U.S. Appl. No. 12/039,539, dated Aug. 2, 2012, 22 pages.

Final Office Action, U.S. Appl. No. 12/039,520, dated Apr. 12, 2012, 20 pages.

International Preliminary Report on Patentability, Application No. PCT/US2008/055419, dated Sep. 1, 2009, 7 pages.

International Search Report and Written Opinion, Application No. PCT/US2008/055419, dated Aug. 12, 2008, 13 pages.

International Preliminary Report on Patentability, Application No. PCT/US2008/055414, dated Sep. 1, 2009, 12 pages.

International Search Report and Written Opinion, Application No. PCT/US2008/055414, dated Oct. 14, 2008, 18 pages.

International Preliminary Report on Patentability, Application No. PCT/US2008/055415, dated Sep. 1, 2009, 7 pages.

International Search Report and Written Opinion, Application No. PCT/US2008/055415, dated Sep. 3, 2008, 12 pages.

International Preliminary Report on Patentability, Application No. PCT/US2008/055416, dated Sep. 1, 2009, 6 pages.

International Search Report and Written Opinion, Application No. PCT/US2008/055416, dated Jul. 28, 2008, 9 pages.

International Preliminary Report on Patentability, Application No. PCT/US2008/055424, dated Sep. 1, 2009, 7 pages.

(56) References Cited

OTHER PUBLICATIONS

International Search Report and Written Opinion, Application No. PCT/US2008/055424, dated Aug. 19, 2008, 10 pages.
Non-Final Office Action, U.S. Appl. No. 12/039,539, dated Aug. 18, 2011, 18 pages.
Final Office Action, U.S. Appl. No. 12/039,509, dated Jan. 4, 2011, 15 pages.
Non-Final Office Action, U.S. Appl. No. 12/039,509, dated Jun. 1, 2010, 12 pages.
Non-Final Office Action, U.S. Appl. No. 12/039,520, dated Aug. 17, 2011, 22 pages.
Final Office Action, U.S. Appl. No. 12/039,520, dated Feb. 1, 2011, 22 pages.
Non-Final Office Action, U.S. Appl. No. 12/039,520, dated Jun. 25, 2010, 19 pages.
Non-Final Office Action, U.S. Appl. No. 12/039,530, dated Sep. 1, 2009, 16 pages.
Notice of Allowance, U.S. Appl. No. 12/039,530, dated Jun. 22, 2010, 8 pages.
Notice of Allowance, U.S. Appl. No. 12/039,530, dated Aug. 5, 2010, 8 pages.

* cited by examiner

CLIENT ADDRESSING AND ROAMING IN A WIRELESS NETWORK

CROSS-REFERENCES TO RELATED APPLICATIONS

This application claims the benefit of U.S. Provisional Application Ser. No. 60/892,449 entitled "Client Addressing And Roaming In A Wireless Network", by Thomer M. Gil, et al., filed Mar. 1, 2007, and the benefit of the following U.S. Provisional applications: entitled "System and Method For Hosted Network Management", by S. Biswas, et al., Ser. No. 60/892,432, filed Mar. 1, 2007; entitled "Node Self-Configuration and Operation in a Wireless Network", by S. Biswas, et al., Ser. No. 60/892,437; entitled "Client Operation For Network Access", by T. Gil, et al., Ser. No. 60/892,440, filed Mar. 1, 2007; entitled "System and Method For Remote Monitoring And Control Of Network Devices", by S. Biswas, et al., Ser. No. 60/892,443, filed Mar. 1, 2007. Priority of the filing dates is hereby claimed, and the disclosures of the Provisional applications are hereby incorporated by reference.

BACKGROUND

Wireless mesh computer networks include at least one node that connects the mesh network to a wide area network (WAN) and one or more wireless access points comprising nodes of the mesh network that communicate with each other, at least one of which communicates with the WAN node. The WAN can comprise, for example, the Internet, and the WAN node is referred to as a gateway. the WAN node typically comprises a cable interface (cable modem) or DSL interface or the like, and the wireless access points typically comprise wireless routers and the like. Client devices, such as laptop computers, PDAs, and other handheld devices may move around in the mesh network while communicating with a wireless access point. As a client device moves around in the network, the distance between the client and the communicating wireless access point will change.

The changing distance between a client device and a wireless access point may negatively affect quality of the connection between them. Typically, the quality of connection decreases with an increase in distance. A client device may also move behind a wall or some other object that similarly decreases the connection quality. To provide uninterrupted wireless network access over large geographic spaces (e.g., over an airport or a residential area or a university campus) it is customary to use multiple wireless access points to provide good coverage everywhere in the geographic space. If a client moves relative to a wireless access point with which it is communicating and suffers from unacceptably degraded connection quality, then the client can begin communication with a different, second wireless access point with which it can experience a better connection quality. Communication with the second wireless access point begins with a login process. A device is said to "roam" in such a network if it can move around and transparently associate with different access points without affecting open connections. Thus, connection from the client device to the local mesh network is preserved, as is the ability for the client to communicate with the external WAN (e.g. the Internet).

For network roaming to work properly, the network address of a client device must remain unchanged during the handover from one access point to another, lest open (active) connections stall and close during handover. A known and stable network address (such as the Internet protocol (IP) address) is needed for communications over the network. Unfortunately, the behavior of clients during handover can be very different from client to client: some client devices flush their ARP cache (Address Resolution Protocol; a table that maps IP addresses to MAC addresses) at each login, and others do not; some devices rerun DHCP (Dynamic Host Configuration Protocol; service for requesting a network address) for a new address at each login, and others do not.

If a device no longer has IP address information for the mesh network due to a flushed ARP cache, then as the client device moves from one access point to another, the device will need to perform the login process to each new access point with which it wants to communicate. It should be apparent that repeating the login process at every new access point increases administrative overhead for the network and is an unsatisfactory networking experience.

For DHCP service, an access point must ensure that it gives a requesting client device its old IP address when the device asks for it. In other words, when presented with a client device's MAC address, an access point needs to give the client device the same IP address the device received when it previously requested DHCP service (otherwise, packets previously destined for the client device will be lost and network communications must begin anew). Traditionally, ensuring consistent network addressing is achieved either by connecting all wireless access points to a central DHCP server that can single handedly be responsible for maintaining IP address information for the local mesh network, or by having all access points in the local network inform each other about clients with which they each associated (i.e., inform all access points in the network about their respective client device MAC addresses and their associated IP addresses).

A single central DHCP server for the wireless network can be inefficient and can result in unreliable network performance and maintenance issues. Continuously exchanging address information between all the access points in the network can also be inefficient, and can incur significant network traffic overhead. Repeated login operations are similarly inefficient and incur significant overhead.

From the discussion above, it should be apparent that there is a need for seamless client addressing and roaming over a wireless network that does not degrade reliability and is not inefficient. The present invention satisfies this need.

SUMMARY

Described herein is a managed network that receives client device requests for network addresses for communications over the managed network and computes a network address for a client device based on a hardware identifier of the client device that ensures the client device will receive the same network address with every address request. The computed network address can be based on a device-unique feature, such as the MAC (media access control) address of the client device. Computing the network address based on a hardware identifier of the client device ensures that the computed network address will consistently be computed to provide the same address value each time the device requests one. The network returns the computed network address to the client device along with a predetermined gateway address for communications over the managed network with external networks. With the techniques described herein, it is not necessary to utilize special data messages or protocols to keep track of network routing when devices communicate using different nodes, and a different uplink can be used without requiring a different network address. In this way, reliable and seamless client addressing and roaming over a wireless network is provided.

The network address can be computed with a hashing operation on the client hardware (MAC) address such that the client device will always receive the same network address whenever it accesses the managed network. All the devices in the managed network can have their network addresses determined in the same fashion. The client device network addresses and gateway device network addresses determined in this way will ensure seamless roaming of clients in the managed network, across otherwise heterogeneous networks, without a central DHCP server and without resolving new network addresses from repeated ARP operations.

Other features and advantages of the present invention should be apparent from the following description of the preferred embodiments, which illustrate, by way of example, the principles of the invention.

DETAILED DESCRIPTION

In accordance with embodiments of the invention, a mesh wireless network is operated so that requests for network addresses are received from client devices at wireless access points for communications over the network, thereby comprising a managed network in accordance with the invention. For each requesting client, a network address is computed based on an unchanging aspect of the requesting client. The unchanging aspect may comprise, for example, the hardware address or media access control (MAC) address of the client device. In the case of using the MAC address, the device MAC address is hashed to produce the network address such that the client device will always receive the same network address whenever it accesses the managed network. The computed network address is returned to the client device following the address request. Gateway devices (i.e., routers) of the managed network are assigned network addresses in the same manner. Thus, all devices that communicate over the managed network will be assigned addresses within the managed network in the same manner and therefore will be able to readily address (communicate with) each other. This provides an improved network roaming experience. In a conventional network, it would be necessary for client devices to request new network addresses each time they needed to communicate with a different network node (wireless access point).

The wireless access points of the managed network will also be referred to as network nodes. In the managed network, a host server (backend node) manages the network and communicates with the wireless access points. These nodes of the mesh network communicate with the host server over a network such as the Internet, using Internet protocol (IP) addressing techniques. Although the Internet will be referenced in the discussion that follows, it should be understood that the invention applies as well to network configurations generally.

When a client device starts up and wants to communicate with a network node, the client device associates with the node and requests a network address. In the case of Internet protocol communications, the client device sends a DHCP request to the node. Thereafter, for communications in the same managed network (same SSID), there is no need for the client to request another network address. Each new node in the managed network will be able to determine the network address of any client in the managed network upon receiving any client message. This ensures that network communications will not be broken from login requests as a client device roams through the network. Thus, the client can roam seamlessly through the network, from access point to access point.

Figure 1:
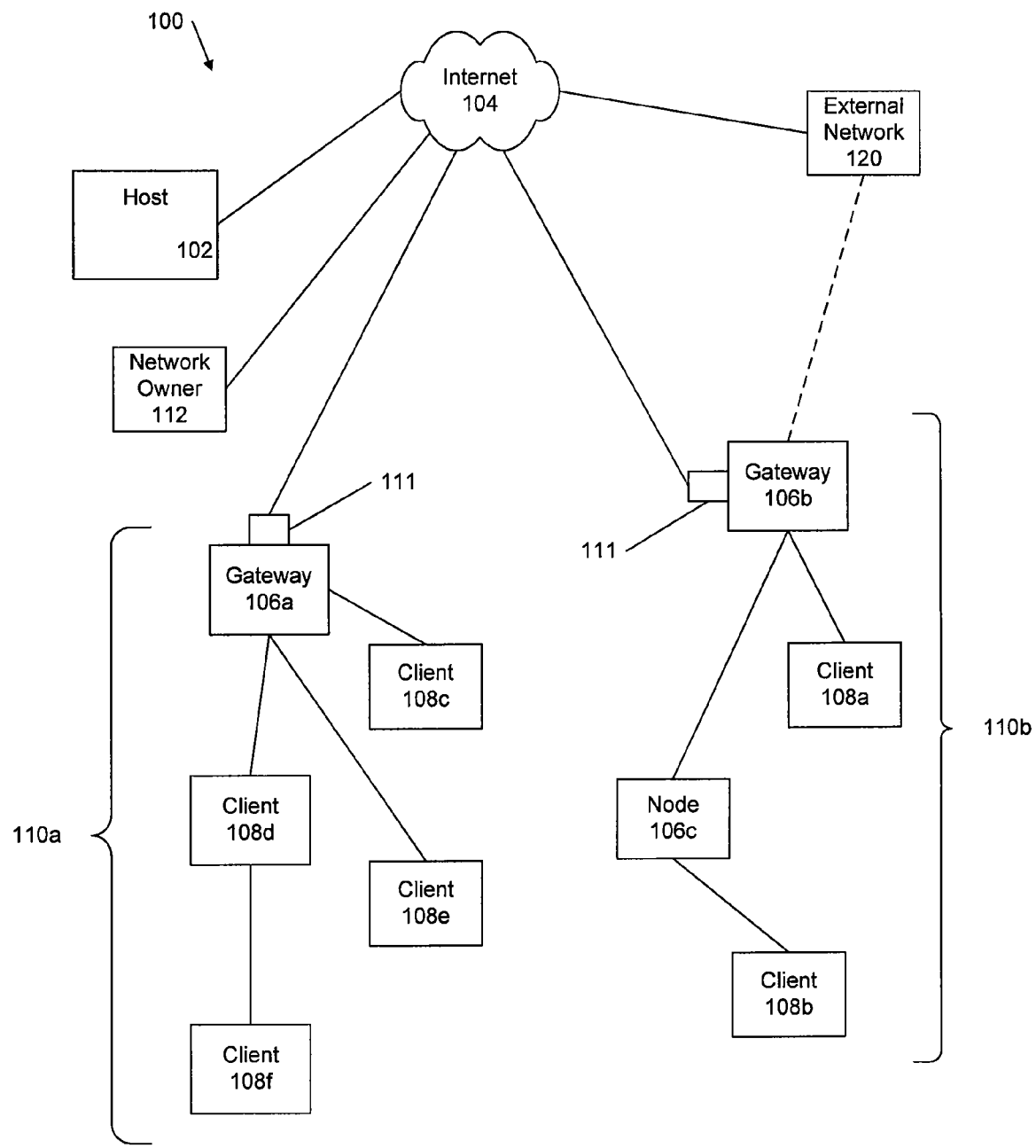
FIG. 1 is a block diagram representation of a hosted network 100 constructed in accordance with the invention.

FIG. 1 is a block diagram representation of a hosted network 100 constructed in accordance with the invention. The hosted network 100 includes a host 102 that communicates over a network infrastructure 104, such as the Internet, with multiple communication devices 106, 108. The communication devices include network traffic devices 106, such as access points or routers, and client devices 108, such as laptop computers, desktop computers, and portable computing devices, all of which are capable of communicating with each other using a network communications protocol specification. In FIG. 1, particular communication devices 106, 108 are designated with a letter suffix ("a", "b", etc.). Particular devices will be referenced by their respective suffix 106a, 106b, 106c and 108a, 108b, . . . , 108f. References to the devices 106, 108 without their particular suffix will be understood to be a reference to the group collectively.

All of the devices 106, 108 are capable of communicating with each other over a wireless network communications protocol specification, such as the 802.11x family specification of the IEEE, also referred to as "wireless broadband" or "WiFi". The devices 106, 108 define a managed network 110 whose member devices communicate with the host computer 102, also referred to as the backend server. The managed network 110 includes component local mesh networks that are identified with a letter suffix ("a" or "b") so that references to the local networks without their suffix are references to the local networks collectively as the managed network. When it is necessary to refer to a particular local network 110a, 110b, the suffix identifier will be used.

The traffic devices 106 in FIG. 1 that are designated as gateways 106a, 106c serve as an interface between the WAN (Internet) 104 and their respective local wireless mesh networks 110a, 110b. FIG. 1 shows each gateway as having an interface device 111 interposed between itself and the Internet 104. That is, the interface device is upstream of the gateway. Those skilled in the art will understand details of such devices, which may comprise cable modems, DSL interfaces, and the like. Alternatively, the interface may be incorporated into the gateway device rather than being a separate component. Each gateway provides an interface between its respective mesh network and the Internet. For example, the gateway 106a is the Internet interface for the mesh network 110a comprising 106a and client 108c, client 108d, client 108e, and client 108f. The gateway 106b is the Internet interface for the mesh network 110b comprising gateway 106b, node 106c, client 108a, and client 108b. The gateways 106a, 106b communicate with the host 102 of the managed network and perform network address translation (NAT) functions for the devices 106, 108 within their respective managed networks 110a, 110b.

The mesh network 110 is operated under the control of a network owner 112, who can access management tools through a network portal interface of the host 102. Therefore, the network owner 112 is illustrated in FIG. 1 as being connected to the Internet 104, whereby the network owner using a computer or similar device can access a Web portal at the host 102 via a conventional Web browser. For the discussion herein, a reference to a "managed network" will be understood to be a reference to a local network having network traffic devices that operate according to the description and drawings herein under management of a network owner 112 through a service portal of the host 102.

The gateway devices 106a, 106b are also capable of network communications via a wired connection, such as Ethernet. The clients 108 can also have this dual capability. Thus, the managed networks 110a, 110b can include devices that are capable of communicating over both wired connections and wireless connections. In this discussion, the traffic devices 106 will also be referred to as routers or nodes of the managed networks. Thus, nodes as used herein comprise devices that can communicate over the managed networks 110 and can send data messages from other nodes toward destinations outside of the managed network, such as over the Internet 104 toward the host 102.

FIG. 1 shows that the network traffic devices (nodes) 106 can be provided with the ability to communicate with external networks that are outside of any of the managed networks 110. Thus, a dotted line represents a connection from the second gateway 106b to an external network 120. The external connection between the two 106b, 120 can comprise a wired connection or a wireless connection. The external network can comprise a connection to the Internet or a local network that does not share the client addressing scheme of the managed networks 110a, 110b and therefore comprises a heterogeneous network relative to the managed networks.

In FIG. 1, the network traffic device corresponding to the gateway 106b is shown with a connection to an external network 120 through which the gateway 106b can forward packets received from the clients 108a, 108b of its mesh network 110b to the uplinked external network 120. Therefore, the gateway 106b is acting as a bridge from the managed network 110b to the uplink external network 120 and performs a network address translation (NAT) function for the managed network relative to the uplinked network. The connection from the managed network gateway 106b to the external network 120 can be either a wireless connection or a wired (Ethernet) connection. Any one of the traffic devices 106 constructed in accordance with the invention can perform the uplink function, as described more fully below, including the gateway devices 106a, 106b and the node 106c. That is, all of the traffic devices 106a, 106b, 106c have a similar construction and therefore have similar operational capabilities.

In accordance with the invention, the managed networks 110a, 110b do not use a central DHCP server for network addressing and do not force all the routers 106 to exchange ARP information for intra-network communications. Rather, the routers 106 all determine a network address for their constituent clients 108 by deriving the address to be assigned a client device from the fixed hardware address of the device. The hardware address can comprise, for example, the well-known media access control (MAC) address assigned to a conventional network-enabled device upon manufacture.

At startup, a client device 108 in one of the managed networks 110 will broadcast a DHCP request for a network address and will attempt to associate with an access point (router) of the corresponding managed network 110a, 110b. In accordance with the invention, all routers of the managed network will determine the proper network address in the same way, based on the client MAC address. Thus, any managed network router with which the client device associates will be able to return the proper network address. Because all routers in the managed networks will perform the same network address process for clients, a client device will always get the same network IP address from any router with which it associates in a managed network administered by the host 102. The returned address is used by the client device for intra-network communications with the gateway. Thus, there is no need for additional protocol for routers to determine the IP address for clients, even if they roam in the managed network from access point to access point, and clients making DHCP requests will always receive the same address regardless of the router with which they are associated.

In the illustrated embodiment, the IP address assignment process of the routers 106 uses a CRC-32 function to hash the 6-byte MAC address of a client device to a 4-byte number. The most significant byte of the hashed 4-byte number is replaced with the decimal value ten (10) to ensure that all devices in the managed networks 110 will have the same (10.0.0.0/8) subnet value. That is, all gateway routers in the managed system 100 will use the same Class A address space. If the least significant byte of the hashed 4-byte number is zero, then it is replaced with decimal one (1). If the least significant byte of the hashed 4-byte number is decimal "255", then it is changed to decimal "254". The change reserves the two addresses (ending in 0 and 255) so that network systems will not treat the assigned IP addresses as broadcast addresses.

In addition to returning the computed IP address to a requesting client device 108, a gateway 106 of the managed networks 110 will also include a gateway address for the managed network that is the same for all managed gateways. In the illustrated system 100, for example, the gateway address of 10.128.128.128 is included in the DHCP reply message from the gateways 106 to each client device. Because all devices in the managed networks 110 determine IP addresses in accordance with the MAC address hash process described above, the gateways effectively appear to have the same MAC address to all devices in the managed networks, which corresponds to 00:18:0A:00:00:01 (hexadecimal).

All of the gateways 106a, 106b in the managed network have a wireless interface with the same MAC address of 00:18:0A:00:00:01 (hexadecimal) through a "MAC spoofing" technique known to those skilled in the art. Because all gateways of the managed networks 110 have the same gateway IP address of (10.128.128.128), and because all of the node devices 106a, 106b, 106c can serve as a gateway, the client devices can reassociate with gateways as they roam within their managed network. The clients can rerun DHCP (and get their old IP address again), they can flush their ARP cache, and they still can continue using the gateway address of 10.128.128.128 with the MAC address 00:18:0A:00:00:01 as their gateway. In this way, the client devices will not lose their link-level connection when they roam, and therefore they can roam transparently throughout their respective managed networks.

Figure 2:
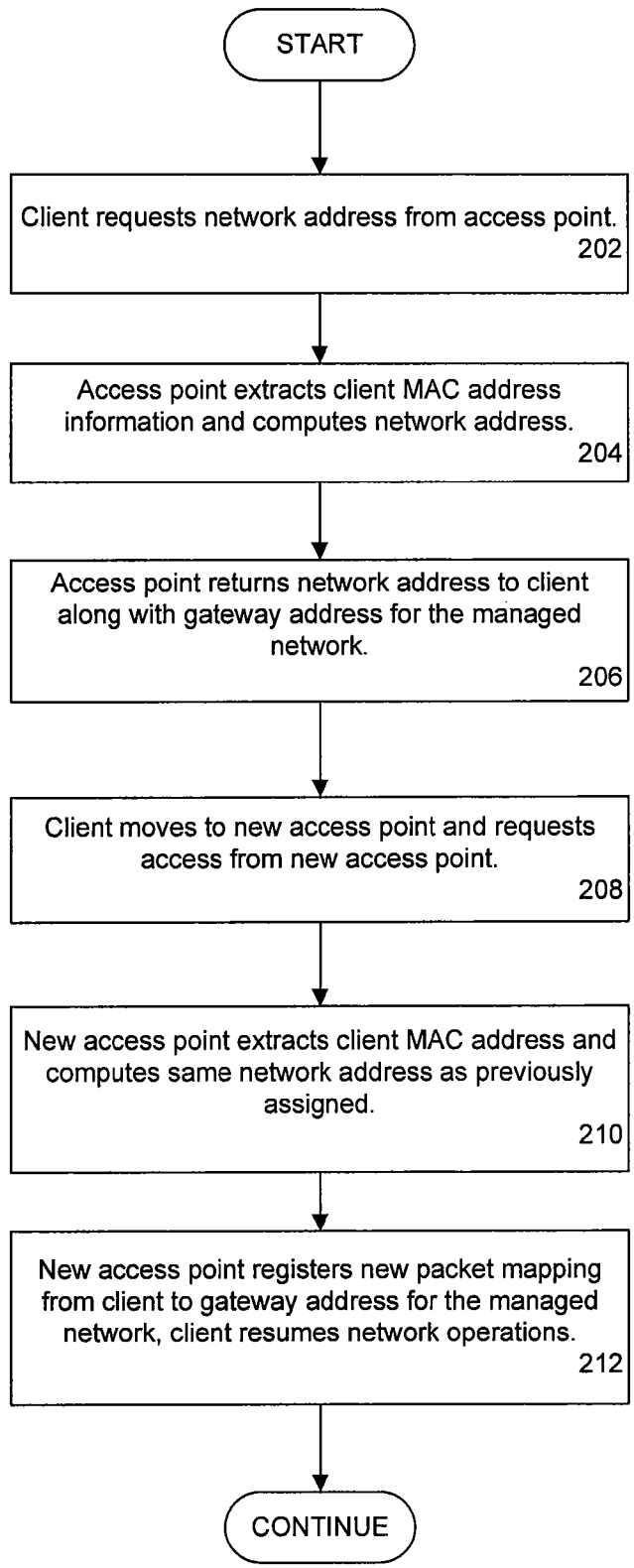
FIG. 2 is a flowchart that illustrates network address processing of the FIG. 1 system.

FIG. 2 is a flow diagram that illustrates the IP address assignment operation in the managed networks 110. In the first operation, indicated by the FIG. 2 box numbered 202, a client requests a network address from an access point of the managed network. Any one of the access points (routers) in the managed network can provide the appropriate network address, using the techniques described herein. At box 204, the gateway access point extracts MAC address information from the client device request and computes a network IP address as described above. The gateway access point then returns the computed IP address to the client device, along with the fixed gateway address for the managed network. This processing is indicated by box 206. The client device can then commence network communications to the Internet from within the managed network.

During operation, operation, the client device might move within the managed network 110 (FIG. 1) and, as a result, the connection quality can degrade. Client devices are configured to react to degraded quality connections according to their own design specifications, but at some point, client devices will initiate a transfer or handoff process whereby the client device will associate with a new access point. For example, the client 108*e* might move from the first access point 106*a* toward a different access point 106*c*. At box 208, the client requests access from the new access point 106*c*. When the client associates with the new access point, the new access point may or may not constitute a gateway in direct communication with the WAN (e.g. Internet). At box 210, the new access point extracts the client device MAC address and computes the IP address for the client device, which will be the same IP address as was assigned at box 204. At box 212, the client resumes network operations and the new access point sends packets it receives from the client to the gateway with which the new access point is associated for WAN access. In addition, the new access point 106*c* updates the node table with the new client-to-WAP routing to show the new access point association. In the example of the client 106*e* moving from the WAP 106*a* to the new WAP 106*c*, the new access point 106*c* will update the routing table for the managed network to show that packets from the client 108*e* are routed to the node 106*c* (and then to the gateway 106*b*). Thus, the client device continues the network access uninterrupted, having seamlessly moved from one access point to another.

Figure 3:
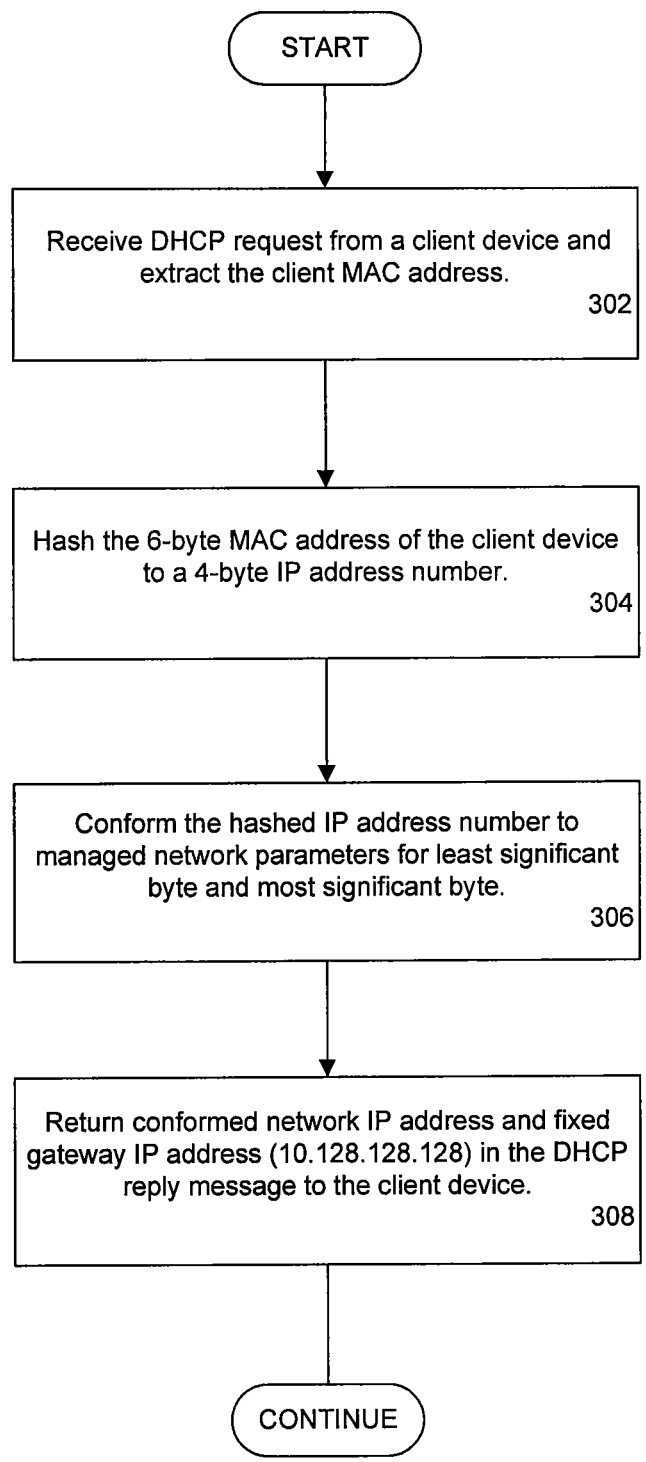
FIG. 3 is a flowchart that illustrates network address determination for a client device in the FIG. 1 system.

FIG. 3 is a flow chart that illustrates operations performed by the gateway routers 106 to assign intra-network IP addresses to client devices. In the first operation, illustrated by the first box 302, the router receives a DHCP request from a client device and extracts the client MAC address from the request message. At box 304, the router uses a conventional CRC-32 function to hash the 6-byte hexadecimal MAC address of a client device to a 4-byte decimal number. The router than conforms the hashed number to managed network parameters, as indicated at box 306. The conforming operations involve replacing the most significant byte of the hashed 4-byte number with the decimal value ten (10) to ensure that all devices in the managed networks will have the same (10.0.0.0/8) subnet value. If the least significant byte of the hashed 4-byte number is zero, then it is replaced with decimal one (1). If the least significant byte of the hashed 4-byte number is decimal "255", then it is changed to decimal "254". At box 308, the conformed network IP address is returned to the requesting client device, along with the fixed gateway IP address number (10.128.128.128) in the DHCP reply message.

A variety of hardware configurations can be used for the devices described above. For example, conventional server and desktop computers can be used for the server host 102. In the illustrated embodiment, the server operates the Linux operating system. Other details of construction and operation will occur to those skilled in the art in view of the description herein. The nodes 106 can comprise routers, wireless access points, and suitably configured computer devices that might otherwise comprise clients 108 in the managed network. In the illustrated embodiment described herein, the nodes that process network traffic are specified as operating with the Linux operating system. Those skilled in the art will appreciate that a wide variety of device operating systems other than Linux can provide a suitable environment for execution of the operations described herein. Thus, any computer device that can perform the operations described herein can be utilized in a managed network system constructed in accordance with the invention.

Figure 4:
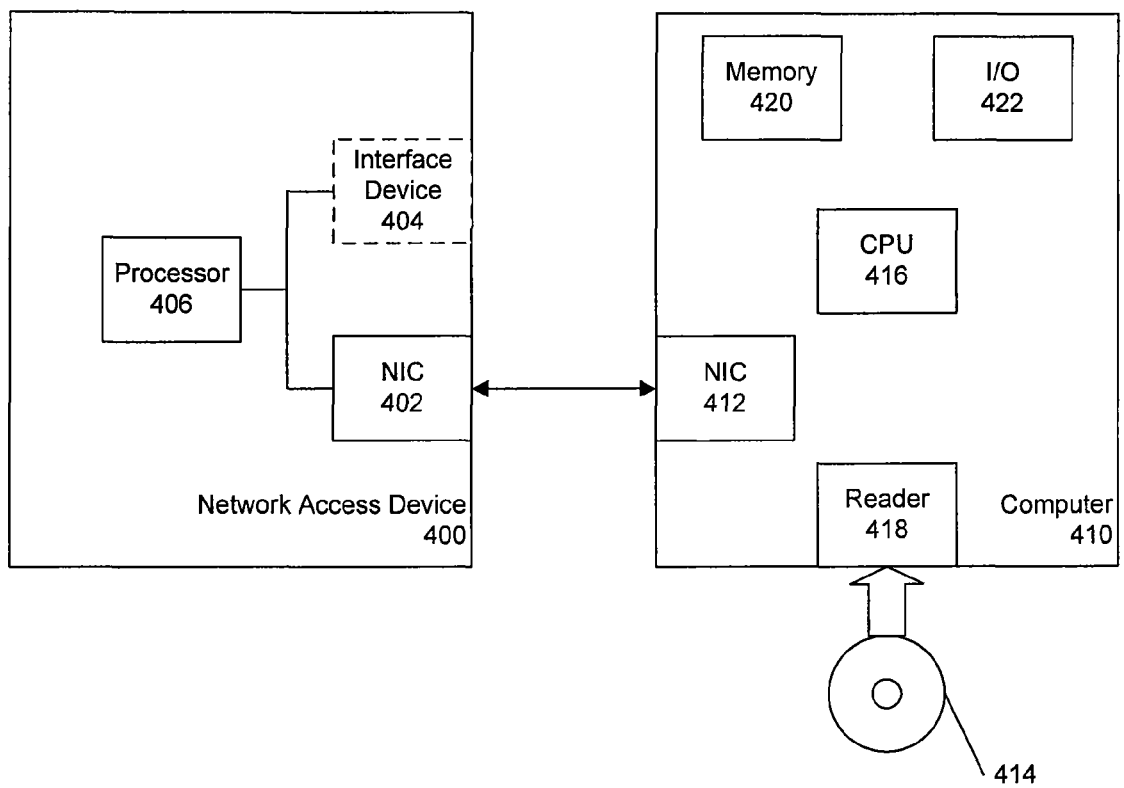
FIG. 4 is a block diagram that shows suitable network access devices constructed in accordance with the present invention.

FIG. 4 shows configurations for a network access device constructed in accordance with the present invention. A network access device for the managed network can comprise, for example, a wireless router or other access point for the managed network, or can comprise a personal computer or server device that operates as an access point. As noted above, such network access devices can operate as one of the gateway devices 106*a*, 106*b*, 106*c* illustrated in FIG. 1.

Two devices are illustrated in FIG. 4 that are capable of operation as gateways 106. One such device 400 in FIG. 4 comprises a wireless access point and includes a network communication interface 402 that permits communications with a network. The network interface can comprise a network interface card (NIC). The FIG. 4 device 400 includes an optional interface device 404 comprising a cable modem or DSL interface or the like. The interface device 404 is illustrated in dashed line to indicate that such capability is an optional component of the network access device 400, and to show that the interface device can be provided external to the network access device. The processor 406 of the device 400 comprises a computer processor chip and associated circuitry and related components, such as program memory, data memory, central processor unit, and the like. The processor 406 enables the device 400 to operate in accordance with the description herein via execution of appropriate program instructions.

The second device 410 illustrated in FIG. 4 that can operate as a gateway comprises a computer system such as a personal computer or server computer or the like. The computer 410 includes a network communication interface 412 that permits communications with a network. The network interface can comprise a network interface card (NIC).

The processor 406 of the access point 400 can receive program instructions for proper operation into the program memory of the processor. The program instructions can be received directly, such as by flashing EEPROM of the processor, or can be received through the network interface 402, such as by download from a connected device or over a WAN or LAN network communication. In the case of receiving program instructions through the network interface, the device 400 can be connected to the computer 410 that includes the program instructions in a suitable data file. If desired, the program instructions can be stored on a computer program product 414 that is read by the computer 410 so that the program instructions can thereafter be transferred to the device 400. That is, the program product 414 is for use in a computer system such as the computer 410, wherein the program product comprises a recordable media containing a program of computer-readable instructions that are executable by the device processor 404 to perform the operations described herein. The program instructions of the program product 414 can be transferred by the computer 410 to the device 400, whereupon the instructions can be executed by the device so as to operate in accordance with the methods and operations described herein. The program product 414 can comprise, for example, optical program media such as CD or DVD data discs, or flash memory drives, or external memory stores, or floppy magnetic disks, and the like. The computer 410 includes a central processor 416 and a program product reader 418 for receiving the program product media and reading the program instructions. The computer also includes associated memory 420 and input/output facilities 422, such as a display and keyboard.

Although the network communications have been described above in accordance with the Internet protocol (IP), it should be understood that a wide variety of network communication protocols can be accommodated in accordance with the invention. The operations described herein for the gateways routers 106 and client devices 108 can be performed by device firmware or by application software installed on the respective devices. All of the devices capable of network communications will include any necessary network interface components, as will be known to those skilled in the art. The programming such as firmware and application software for the operations described herein can be installed through conventional manufacturing and production processes and through typical program installation techniques for computer devices. For example, the programming can be installed from program media containing machine instructions that can be read from media such as CD or DVD optical disc devices such that when the instructions are executed by the computer device they will cause operation in accordance with the techniques described herein. Other sources of such programming include external program sources such as memory chips, floppy disks, thumb drives, flash memory, and the like that are received into reader devices such that the program instructions can be installed.

The present invention has been described above in terms of presently preferred embodiments so that an understanding of the present invention can be conveyed. There are, however, many configurations for network devices and management systems not specifically described herein but with which the present invention is applicable. The present invention should therefore not be seen as limited to the particular embodiments described herein, but rather, it should be understood that the present invention has wide applicability with respect to network devices and management systems generally. All modifications, variations, or equivalent arrangements and implementations that are within the scope of the attached claims should therefore be considered within the scope of the invention.

We claim:

1. A method of network addressing for a client device using a wireless network communication protocol, the method comprising: receiving a first dynamic host configuration protocol (DHCP) request at a first of a plurality of network traffic devices from the client device for an Internet protocol (IP) address for the client device over a local area network (LAN) associated with the first network traffic device, each of the plurality of network traffic devices operating in an infrastructure mode as one of a gateway device and a wireless access point (AP), wherein the network traffic devices form a wireless mesh network, wherein each of the network traffic devices operating in the infrastructure mode as a gateway device performs network address translation (NAT) for client devices currently associated with, wherein each of the network traffic devices is configured to generate, responsive to DHCP requests from client devices, IP addresses based on applying a predetermined arithmetic function on hardware identifiers of the respective client devices without using a centralized DHCP server, such that the same IP addresses will be assigned to the same client devices when roaming amongst different ones of the network traffic devices, wherein operating in infrastructure mode comprises each of the client devices being coupled to one or more of the plurality of network traffic devices;
 extracting, by the first network traffic device, a hardware identifier from the first DHCP request, the hardware identifier uniquely identifying the client device;
 computing, at the first network traffic device, a first IP address for the client device based on applying the predetermined arithmetic function on the hardware identifier of the client device without using the centralized DHCP server; and
 returning a first DHCP response to the client device over the LAN, the first DHCP response including the first IP address to be assigned to the client device and a predetermined gateway IP address for reaching a first gateway device associated with the first network traffic device, the first gateway device providing an interface between the first network traffic device and the Internet,
  wherein every one of the plurality of network traffic devices provides the same predetermined gateway IP address to be used for reaching a gateway device associated with that network traffic device, wherein client devices roaming between the network traffic devices will be assigned their same respective IP addresses and will receive the same predetermined gateway IP address from every one of the plurality of network traffic devices.

2. The method as defined in claim 1, wherein the hardware identifier of the client device comprises a media access control (MAC) address of the client device, and computing a first IP address comprises performing a hash function on the MAC address of the client device.

3. The method as defined in claim 2, wherein performing a hash function on the MAC address of the client device comprises:
 hashing, using the hash function, six bytes of the MAC address of the client device to form least significant three bytes of the first IP address; and
 assigning the most significant byte of the first IP address with a predetermined subnet value, such that all client devices associated with the plurality of network traffic devices is associated with an identical subnet.

4. The method as defined in claim 3, further comprising replacing the least significant byte of the first IP address with a decimal value of 254, if the least significant byte of the first IP address equals to a decimal value of 255 as a result of the hash function.

5. The method as defined in claim 3, further comprising replacing the least significant byte of the first IP address with a decimal value of 1, if the least significant bye of the first IP address equals to a decimal value of 0 as a result of the hash function.

6. The method as defined in claim 1, further comprising:
 receiving a second DHCP request at a second one of the plurality of the network traffic devices from the client device for an IP address, wherein the client device wirelessly roams from the first network traffic device to the second network traffic device;
 extracting, by the second network traffic device, the hardware identifier of the client device from the second DHCP request;
 computing a second IP network address for the client device at the second network traffic device based on the hardware identifier of the client device using the predetermined arithmetic function, such that the second IP address and the first IP address are identical; and
 returning a second DHCP response to the client device, the second DHCP response including the second IP address for the client device and the predetermined gateway IP address to reach a second gateway device associated with the second network traffic device, wherein the second gateway device provides an interface between the second network traffic device and the Internet, wherein the first gateway device and the second gateway device are represented by the same predetermined gateway IP address.

7. The method as defined in claim 1, wherein client devices roaming between the network traffic devices will not lose their link level connections when roaming between different ones of the network traffic devices because the client devices will be assigned their same respective IP addresses and will receive the same predetermined gateway IP address and gateway MAC address for every one of the plurality of network traffic devices.

8. The method as defined in claim 6, wherein with the same IP address assigned to the client device, the first and second network traffic devices do not have to exchange address resolution protocol (ARP) information with each other for intra-network communications concerning the client device.

9. The method as defined in claim 1, wherein with the same IP address of the client device, the network traffic devices do not have to resolve new network addresses from repeated address resolution protocol (ARP) operations when the client device roams amongst the network traffic devices.

10. The method as defined in claim 1, wherein every one of the network traffic devices is associated with an identical service set identifier (SSID).

11. The method as defined in claim 2, wherein the hash function comprises a cyclic redundancy check 32 (CRC-32) function.

12. The method as defined in claim 1, wherein the plurality of the network traffic devices are managed by a host server over the Internet, forming a logical managed network, wherein the network traffic devices are owned by a network owner, wherein the host server provides a set of management tools via a Web portal to allow the network owner to configure the network traffic devices over the Internet using a Web browser.

13. A non-transitory computer readable medium having instructions stored therein, which when executed by a processor, cause the processor to perform operations comprising:
receiving a first dynamic host configuration protocol (DHCP) request at a first of a plurality of network traffic devices, operating in an infrastructure mode, from a client device for an Internet protocol (IP) address for the client device over a local area network (LAN) associated with the first network traffic device, each of the plurality of network traffic devices operating as one of a gateway device and a wireless access point (AP), wherein the network traffic devices form a wireless mesh network, wherein each of the network traffic devices operating as a gateway device performs network address translation (NAT) for client devices currently associated with, wherein each of the network traffic devices is configured to generate, responsive to DHCP requests from client devices, IP addresses based on applying a predetermined arithmetic function on hardware identifiers of the respective client devices without using a centralized DHCP server, such that the same IP addresses will be assigned to the same client devices when roaming amongst different ones of the network traffic devices, wherein operating in infrastructure mode comprises each of the client devices being coupled to one or more of the plurality of network traffic devices;
extracting, by the first network traffic device, a hardware identifier from the first DHCP request, the hardware identifier uniquely identifying the client device;
computing, at the first network traffic device, a first IP address for the client device based on applying the predetermined arithmetic function on a hardware identifier of the client device without using the centralized DHCP server; and
returning a first DHCP response to the client device over the LAN, the first DHCP response including the first IP address to be assigned to the client device and a predetermined gateway IP address for reaching a first gateway device associated with the first network traffic device, the first gateway device providing an interface between the first network traffic device and the Internet, wherein every one of the plurality of network traffic devices provides the same predetermined gateway IP address to be used for reaching a gateway device associated with that network traffic device, wherein client devices roaming between the network traffic devices will be assigned their same respective IP addresses and will receive the same predetermined gateway IP address from every one of the plurality of network traffic devices.

14. The non-transitory computer-readable medium as defined in claim 13, wherein the hardware identifier of the client device comprises a media access control (MAC) address of the client device, and computing a first IP address comprises performing a hash function on the MAC address of the client device.

15. The non-transitory computer-readable medium as defined in claim 14, wherein performing a hash function on the MAC address of the client device comprises:
hashing, using the hash function, six bytes of the MAC address of the client device to form least significant three bytes of the first IP address; and
assigning the most significant byte of the first IP address with a predetermined subnet value, such that all client devices associated with the network traffic devices is associated with an identical subnet.

16. The non-transitory computer-readable medium as defined in claim 15, wherein the method further comprises replacing the least significant byte of the first IP address with a decimal value of 254, if the least significant byte of the first IP address equals to a decimal value of 255 as a result of the hash function.

17. The non-transitory computer-readable medium as defined in claim 15, wherein the method further comprises replacing the least significant byte of the first IP address with a decimal value of 1, if the least significant bye of the first IP address equals to a decimal value of 0 as a result of the hash function.

18. The non-transitory computer-readable medium as defined in claim 13, wherein the method further comprises:
receiving a second DHCP request at a second one of the plurality of the network traffic devices from the client device for a network address for network communications issued by the second network traffic device, wherein the client device wirelessly roams from the first network traffic device to the second network traffic device;
extracting, by the second network traffic device, the hardware identifier of the client device from the second DHCP request;
computing a second IP network address for the client device at the second network traffic device based on the hardware identifier of the client device using the predetermined arithmetic function, such that the second IP address and the first IP address are identical; and
returning a second DHCP response to the client device, the second DHCP response including the second IP address for the client device and the predetermined gateway IP address to reach a second gateway device associated with the second network traffic device, wherein the second gateway device provides an interface between the second network traffic device and the Internet, wherein the first gateway device and the second gateway device are represented by the same predetermined gateway IP address.

19. The non-transitory computer-readable medium as defined in claim 14, wherein client devices roaming between the network traffic devices will not lose their link level connections when roaming between different ones of the network traffic devices because the client devices will be assigned their same respective IP addresses and will receive the same predetermined gateway IP address and gateway MAC address for every one of the plurality of network traffic devices.

20. The non-transitory computer-readable medium as defined in claim 18, wherein with the same IP address assigned to the client device, the first and second network traffic devices do not have to exchange address resolution protocol (ARP) information with each other for intra-network communications concerning the client device.

21. The non-transitory computer-readable medium as defined in claim 13, wherein the plurality of the network traffic devices are managed by a host server over the Internet, forming a logical managed network, wherein the network traffic devices are owned by a network owner, wherein the host server provides a set of management tools via a Web portal to allow the network owner to configure the network traffic devices over the Internet using a Web browser.

22. A network traffic device, comprising:
a wireless network interface to receive a first dynamic host configuration protocol (DHCP) request from a client device for an Internet protocol (IP) address for the client device over a local area network (LAN) associated with the network traffic device, the network traffic device being one of a plurality of network traffic devices, wherein each of the plurality of network traffic devices operates as one of a gateway device and a wireless access point (AP), forming a wireless mesh network, wherein each of the network traffic devices operating in an infrastructure mode as a gateway device performs network address translation (NAT) for client devices currently associated with, wherein each of the network traffic devices is configured to generate, responsive to DHCP requests from client devices, IP addresses based on applying a predetermined arithmetic function on hardware identifiers of the respective client devices without using a centralized DHCP server, such that the same IP addresses will be assigned to the same client devices when roaming amongst different ones of the network traffic devices, wherein operating in infrastructure mode comprises each of the client devices being coupled to one or more of the plurality of network traffic devices; and
a processor coupled to the network interface, where in the processor is configured to extract a hardware identifier from the first DHCP request, the hardware identifier uniquely identifying the client device, compute a first IP address for the client device based on applying the predetermined arithmetic function on a hardware identifier of the client device without using the centralized DHCP server, and
return via the wireless network interface a first DHCP response to the client device, the first DHCP response including the first IP address to be assigned to the client device and a predetermined gateway IP address for reaching a first gateway device associated with the network traffic device, the first gateway device providing an interface between the network traffic device and the Internet, wherein every one of the plurality of network traffic devices provides the same predetermined gateway IP address to be used for reaching a gateway device associated with that network traffic device, wherein client devices roaming between the network traffic devices will be assigned their same respective IP addresses and will receive the same predetermined gateway IP address from every one of the plurality of network traffic devices.

23. The network traffic device as defined in claim 22, wherein the hardware identifier of the client device comprises a media access control (MAC) address of the client device, and computing the first IP address comprises performing a hash function on the MAC address of the client device.

24. The network traffic device as defined in claim 23, wherein performing a hash function on the MAC address of the client device comprises:
hashing, using the hash function, six bytes of the MAC address of the client device to form least significant three bytes of the first IP address; and
assigning the most significant byte of the first IP address with a predetermined subnet value, such that all client devices associated with the network traffic devices is associated with an identical subnet.

25. The method of claim 6, wherein the first gateway device and the second gateway device are represented by an identical predetermined gateway media access control (MAC) address.

26. The method as defined in claim 25, wherein the first network traffic device is a first wireless access point behind the first gateway device, and wherein the second network traffic device is a second wireless access point behind the second gateway device.

27. The method of claim 25, wherein the first network traffic device is a first gateway access point having the first gateway device integrated therein, and wherein the second network traffic device is a second gateway access point having the second gateway device integrated therein.

28. A system for providing network access to a plurality of client devices over local area networks (LANs), the system comprising:
a plurality of network traffic devices, each operating in an infrastructure mode as one of a gateway device and a wireless access point, wherein operating in infrastructure mode comprises each of the plurality of client devices being coupled to one or more of the plurality of network traffic devices, and wherein the network traffic devices form a wireless mesh network to provide network access to the plurality of client devices over the LANs, wherein each of the network traffic devices operating in the infrastructure mode as a gateway device performs network address translation (NAT) for client devices currently associated with, wherein each of the network traffic devices is configured to generate, responsive to dynamic host configuration protocol (DHCP) requests from client devices, Internet protocol (IP) addresses based on applying a predetermined arithmetic function on media access control (MAC) addresses of the respective client devices without using a centralized DHCP server, such that the same IP addresses will be assigned to the same client devices when roaming amongst different ones of the network traffic devices, wherein the plurality of network traffic devices comprises:

a first wireless access point for providing network access for a plurality of first client devices over a first LAN, a first gateway device to provide an interface between the first wireless access point and the Internet to allow the plurality of first client devices to reach the Internet via the first wireless access point, wherein the first gateway device is represented by a predetermined gateway IP address and a predetermined gateway MAC address, a second wireless access point for providing network access for a plurality of second client devices over a second LAN, and a second gateway device to provide an interface between the second wireless access point and the Internet to allow the plurality of second client devices to reach the Internet via the second wireless access point, wherein the second gateway device is represented by the same predetermined gateway IP address and the same predetermined gateway MAC address, wherein the first wireless access point is configured to
receive a first DHCP request from a third client device over the first LAN requesting for an IP address,
in response to the first DHCP request, extract a MAC address of the third client device from the first DHCP request,
compute a first IP address for the third client device by applying the predetermined arithmetic function on the MAC address of the third client device without using a centralized DHCP server, and
return a first DHCP response to the third client device over the first LAN, the first DHCP response including the first IP address and the predetermined gateway IP address to allow the third client device to reach the first gateway device via the first wireless access point, wherein the second wireless access point is configured to
receive a second DHCP request from the third client device over the second LAN requesting for a new IP address, the third client device roaming from the first wireless access point to the second wireless access point,
in response to the second DHCP request, extract the MAC address of the third client device from the second DHCP request,
compute a second IP address for the third client device by applying the same predetermined arithmetic function on the MAC address of the third client device without using a centralized DHCP server, and
return a second DHCP response to the third client device over the second LAN, the second DHCP response including the second IP address and the predetermined gateway IP address to allow the third client device to reach the second gateway device via the second wireless access point, and
wherein the first IP address and the second IP address are identical; and a host server communicatively coupled to the network traffic devices over the Internet, wherein the host server is to manage the network traffic devices, forming a logical managed network, wherein the network traffic devices are owned by a network owner, wherein the host server provides a set of management tools via a Web portal to allow the network owner to configure the network traffic devices over the Internet using a Web browser.

* * * * *